(12) United States Patent
Nakano et al.

(10) Patent No.: US 11,873,235 B2
(45) Date of Patent: Jan. 16, 2024

(54) ACTIVATED CARBON

(71) Applicants: AD'ALL CO., LTD., Kyoto (JP); UNITIKA LTD., Hyogo (JP); OSAKA GAS CHEMICALS CO., LTD., Osaka (JP)

(72) Inventors: Tomoyasu Nakano, Kyoto (JP); Hirokazu Shimizu, Kyoto (JP); Akinori Kawachi, Hyogo (JP); Keiji Sakai, Osaka (JP)

(73) Assignees: AD'ALL CO., LTD., Osaka (JP); UNITIKA LTD., Osaka (JP); GAS CHEMICALS CO., LTD.

( * ) Notice: Subject to any disclaimer, the term of this patent is extended or adjusted under 35 U.S.C. 154(b) by 554 days.

(21) Appl. No.: 17/253,154

(22) PCT Filed: Jun. 18, 2019

(86) PCT No.: PCT/JP2019/024169
§ 371 (c)(1),
(2) Date: Dec. 17, 2020

(87) PCT Pub. No.: WO2019/244903
PCT Pub. Date: Dec. 26, 2019

(65) Prior Publication Data
US 2021/0261441 A1    Aug. 26, 2021

(30) Foreign Application Priority Data

Jun. 19, 2018 (JP) .................. 2018-116188

(51) Int. Cl.
*C02F 1/28* (2023.01)
*B01J 20/20* (2006.01)
(Continued)

(52) U.S. Cl.
CPC .............. *C02F 1/283* (2013.01); *B01J 20/20* (2013.01); *B01J 20/30* (2013.01); *C01B 32/336* (2017.08);
(Continued)

(58) Field of Classification Search
CPC ............... C02F 1/283; C02F 2303/185; C02F 2101/36; C01B 32/336; B01J 20/20; B01J 20/30
See application file for complete search history.

(56) References Cited

U.S. PATENT DOCUMENTS

2019/0177170 A1    6/2019  Modrow et al.

FOREIGN PATENT DOCUMENTS

JP         7-155589 A      6/1995
JP        10-328563 A     12/1998
(Continued)

OTHER PUBLICATIONS

JPH11240707A_English (Year: 1999).*
(Continued)

*Primary Examiner* — Youngsul Jeong
(74) *Attorney, Agent, or Firm* — McDonald Hopkins LLC

(57) ABSTRACT

There is provided an activated carbon having a high total trihalomethane filtration capacity, even in water treatment by passing water at a high superficial velocity (SV). In the activated carbon of the present invention, a pore volume A of pores with a size of 1.0 nm or less, of pore volumes calculated by the QSDFT method, is 0.3 cc/g or more, and a pore volume B of pores with a size of 3.0 nm or more and 3.5 nm or less, of pore volumes calculated by the QSDFT method, is 0.009 cc/g or more.

7 Claims, 6 Drawing Sheets

(51) Int. Cl.
    *B01J 20/30*     (2006.01)
    *C01B 32/33*     (2017.01)
    *C01B 32/336*     (2017.01)
    *C02F 101/36*     (2006.01)

(52) U.S. Cl.
    CPC .... *C02F 2101/36* (2013.01); *C02F 2303/185* (2013.01)

(56) References Cited

FOREIGN PATENT DOCUMENTS

| | | | | |
|---|---|---|---|---|
| JP | 11240707 | A | 9/1999 | |
| JP | H11240707 | A * | 9/1999 | ............. C01B 31/08 |
| JP | 2004-182511 | A | 7/2004 | |
| JP | 2005-1968 | A | 1/2005 | |
| JP | 2006-247527 | A | 9/2006 | |
| JP | 2017-178635 | A | 10/2017 | |
| JP | 2017-179616 | A | 10/2017 | |
| JP | 2018-39685 | A | 3/2018 | |
| WO | 03026792 | A1 | 4/2003 | |
| WO | WO-03026792 | A1 * | 4/2003 | ............. B01J 20/20 |
| WO | 2017097447 | A1 | 6/2017 | |
| WO | WO-2017097447 | A1 * | 6/2017 | ............... A62D 5/00 |
| WO | 2017/213057 | A1 | 12/2017 | |

OTHER PUBLICATIONS

WO-2017097447-A1_English (Year: 2017).*
WO-03026792-A1_English (Year: 2003).*
English Translation of International Search Report dated Sep. 17, 2019; International Patent Application No. PCT/JP2019/024169 filed Jun. 18, 2019. ISA/JP.
Extended European Search Report dated Jan. 12, 2022; European Patent Application No. 19822785.2.

* cited by examiner

ACTIVATED CARBON

CROSS-REFERENCE TO RELATED APPLICATION

This application is a 35 U.S.C. 371 national stage filing of PCT Application No. PCT/JP2019/024169, filed on Jun. 18, 2019, which claims the benefit of Japanese Patent Application No. 2018-116188, filed on Jun. 19, 2018, both of which are incorporated herein in their entirety by reference.

TECHNICAL FIELD

The present invention relates to an activated carbon, and particularly to an activated carbon having an excellent filtration capacity for trihalomethanes at a high superficial velocity.

BACKGROUND ART

Conventionally, tap water and the like for drinking purposes contain chlorine added for disinfection. However, chlorine contained in tap water reacts with organic substances contained in the tap water to produce organic halogen compounds. For example, it is known that humic substances, which are natural organic substances, produce carcinogenic trihalomethanes upon reaction with chlorine in tap water. Therefore, activated carbons have been proposed which have an excellent filtration capacity for these organic halogen compounds contained in tap water.

As an activated carbon having an excellent filtration capacity for organic halogen compounds, an adsorbent is known which comprises a porous carbon in which a pore volume ratio of pores with a size of 20 to 100 Å (2 to 10 nm) is 5 to 50%, and a pore volume ratio of pores with a size of 10 Å (1 nm) or less is 45% or more, relative to a pore volume of pores with a size of 100 Å (10 nm) or less (see, for example, Patent Literature 1). Patent Literature 1 discloses that, in the adsorbent, the pore volume ratio of pores with a size of 20 to 100 Å is set to 5 to 50% relative to the pore volume of pores with a size of 100 Å or less, in order to increase the proportion of relatively large pores to improve the dynamic adsorption capacity; on the other hand, because it is also necessary to increase the equilibrium adsorption amount, i.e., static adsorption capacity, of the adsorbent, the pore volume ratio of pores with a size of 10 Å or less, which are effective for increasing the static equilibrium adsorption amount, is set to 45% or more. Patent Literature 1 discloses that, because of this structure, the adsorbent is excellent in both static adsorption capacity and dynamic adsorption capacity.

Moreover, an activated carbon is known in which, in a pore size distribution determined by the BJH method based on a nitrogen adsorption isotherm at 77.4 K, a pore volume of mesopores with a diameter of 30 Å or more and less than 50 Å is 0.02 to 0.40 cc/g, and a proportion of the pore volume of the mesopores in the above-defined range relative to a total pore volume is 5 to 45% (see, for example, Patent Literature 2). Patent Literature 2 discloses that the activated carbon obtained by controlling the pore volume of the mesopores (pores with a diameter of 2 to 50 nm) and the proportion thereof to fall in the above-defined ranges can be used as a material suitable for adsorbing various substances (particularly trihalomethanes).

CITATION LIST

Patent Literature

Patent Literature 1: JP 2006-247527 A
Patent Literature 2: JP 2004-182511 A

SUMMARY OF INVENTION

Technical Problem

Water filters containing such activated carbons have recently been required to provide a high total trihalomethane filtration capacity. For example, water filters have been demanded to provide a large total amount of filtrate from which total trihalomethanes have been filtered (amount of filtrate until the removal rate for total trihalomethanes decreases to 80%) based on "Test of Filtration Capacity for Volatile Organic Compounds" as specified in JIS S3201. The larger the total amount of filtrate, the longer the period during which the water filter is usable (replacement period).

Additionally, when a water filter is used for a faucet-integrated water purifier, the water filter needs to be reduced in size. When a water filter has a small size, the superficial velocity (SV) increases, which makes it difficult for the water filter to maintain a high total trihalomethane filtration capacity.

Research by the present inventors has revealed that the activated carbons disclosed in Patent Literatures 1 and 2, which were evaluated at an SV of 1000 h$^{-1}$, cannot exhibit a sufficient filtration capacity for total trihalomethanes at a high superficial velocity (for example, an SV of about 3000 h$^{-1}$).

It is a main object of the present invention to solve the aforementioned problem to thereby provide an activated carbon having a high total trihalomethane filtration capacity, even in water treatment by passing water at a high superficial velocity (SV), and a method for producing the activated carbon.

Solution to Problem

Trihalomethane molecules are believed to be easily adsorbed by pores with a size of 1.0 nm or less. The present inventors, however, believed that the rate at which trihalomethane molecules diffuse into the pores is also an important factor in the research of filtration of total trihalomethane molecules at a high SV. Thus, the present inventors conducted extensive research from these viewpoints, and found that when the pore size and the pore volume of an activated carbon is controlled such that the pore volume of pores with a size of 1.0 nm or less falls in a specific range, and the pore volume of pores with a size of 3.0 nm or more and 3.5 nm or less falls in a specific range, the activated carbon has a high total trihalomethane filtration capacity even at a high SV.

For example, in the invention disclosed in Patent Literature 1, the pore volume of pores with a range of sizes as broad as 2 to 10 nm of mesopores is controlled to improve the dynamic adsorption capacity. Patent Literature 1, however, fails to consider improving the filtration capacity at a high SV, such as 3000 h$^{-1}$, as well as controlling the pore volume of pores with a size of 1.0 nm or less in a specific range, and controlling the pore volume of pores with a size of 3.0 nm or more and 3.5 nm or less. Indeed, the activated carbon specifically disclosed as an example in Patent Literature 1 achieves the development of pores with a size of 2 to 10 nm, but has a reduced pore volume of pores with a size of 1 nm or less, and thus, cannot exhibit a sufficient filtration capacity for total trihalomethanes at a high superficial velocity.

For example, in the invention disclosed in Patent Literature 2, the pore volume of relatively large pores with a size of 3 to 5 nm is controlled. Patent Literature 2 discloses that, in a method in which pitch containing 0.01 to 5% by weight of at least one metal component from Mg, Mn, Fe, Y, Pt, and Gd is used as an activated carbon precursor, and the precursor is subjected to an infusibilization treatment or a carbonization treatment, and to an activation treatment, a mesopore mode diameter of the resulting activated carbon is controlled by changing the kind of the metal component. As a specific implementable embodiment, a method is disclosed in which a metal is incorporated into the activated carbon precursor, and the activated carbon precursor is subjected to activation with steam. Patent Literature 2, however, also fails to consider improving the filtration capacity at a high SV, such as 3000 $h^{-1}$, as well as controlling the pore volume of pores with a size of 1.0 nm or less in a specific range, and controlling the pore volume of pores with a size of 3.0 nm or more and 3.5 nm or less. Moreover, research by the present inventors has revealed that although the method specifically disclosed as an example in Patent Literature 2 can increase the pore volume of relatively large pores with a size of 3 to 5 nm, it cannot sufficiently increase the pore volume of pores with a size of 1.0 nm or less, and the resulting activated carbon cannot exhibit a sufficient filtration capacity for total trihalomethanes at a high superficial velocity.

The present inventors conducted further research, and found that only when iron (Fe) is selected as the metal to be incorporated into an activated carbon precursor, and $CO_2$ is selected as the gas to be used for activating the activated carbon precursor, and then the activated carbon precursor is activated, an activated carbon is obtained having an increased pore volume of pores with a size of 3.0 nm or more and 3.5 nm or less, while maintaining an increased pore volume of pores with a size of 1.0 nm or less, and this activated carbon has a high total trihalomethane filtration capacity even at a high SV.

The present invention was completed as a result of further research based on these findings.

In summary, the present invention provides the following aspects of the invention:

Item 1. An activated carbon in which a pore volume A of pores with a size of 1.0 nm or less, of pore volumes calculated by the Quenched Solid Density Functional Theory (QSDFT) method, is 0.3 cc/g or more, and a pore volume B of pores with a size of 3.0 nm or more and 3.5 nm or less, of pore volumes calculated by the QSDFT method, is 0.009 cc/g or more.

Item 2. The activated carbon according to item 1, wherein a pore volume C of pores with a size of 2.0 nm or more and 3.0 nm or less, of pore volumes calculated by the QSDFT method, is 0.05 cc/g or less.

Item 3. The activated carbon according to item 1 or 2, wherein a proportion of a pore volume (cc/g) of pores with a size of 1.5 nm or less, of pore volumes calculated by the QSDFT method, relative to a total pore volume (cc/g) of the activated carbon calculated by the QSDFT method, is 0.85 or more.

Item 4. The activated carbon according to any one of items 1 to 3, wherein the activated carbon has a specific surface area of 500 to 1800 $m^2/g$.

Item 5. The activated carbon according to any one of items 1 to 4, wherein the activated carbon has a total trihalomethane filtration capacity of 45 L/g or more.

Item 6. The activated carbon according to any one of items 1 to 5, wherein the activated carbon is a fibrous activated carbon.

Item 7. A method for producing the activated carbon according to any one of items 1 to 6, comprising the step of activating an activated carbon precursor comprising 0.1 to 1.5% by mass of iron at a temperature of 900 to 1000° C. in an atmosphere having a $CO_2$ concentration of 90% by volume or more.

Advantageous Effects of Invention

In the activated carbon of the present invention, a pore volume A of pores with a size of 1.0 nm or less, of pore volumes calculated by the QSDFT method, is 0.3 cc/g or more, and a pore volume B of pores with a size of 3.0 nm or more and 3.5 nm or less, of pore volumes calculated by the QSDFT method, is 0.009 cc/g or more, and therefore, the activated carbon has a high total trihalomethane filtration capacity, even in water treatment by passing water at a high superficial velocity (SV).

DESCRIPTION OF EMBODIMENTS

Figure 1:
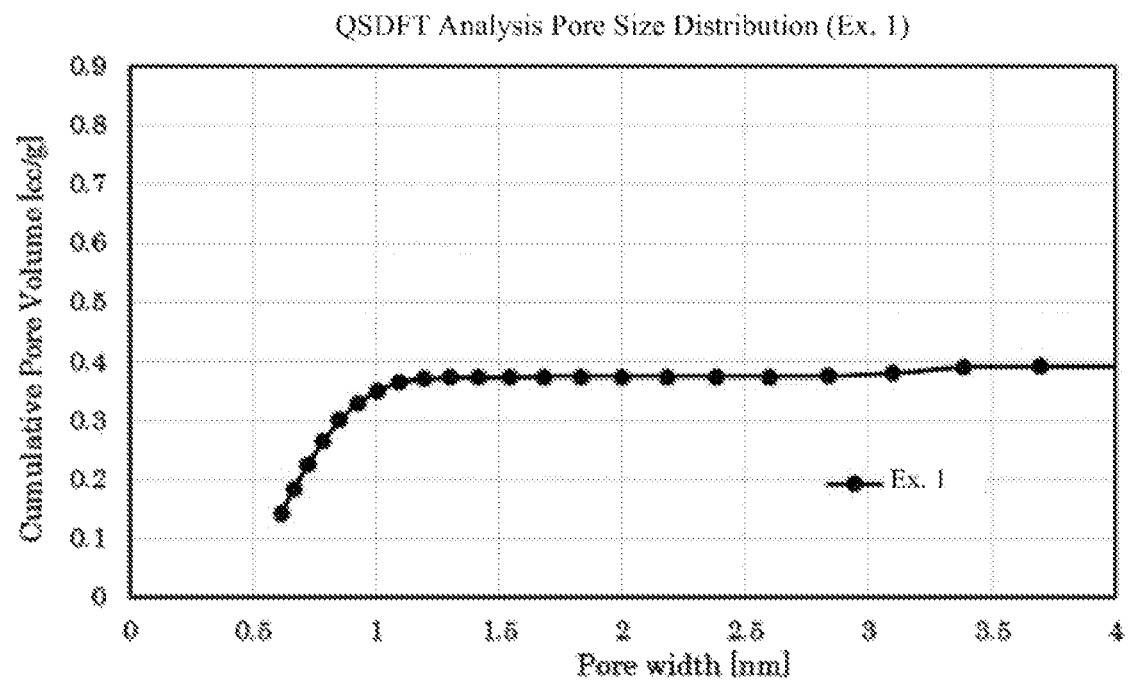
FIG. 1 is a graph showing a pore size distribution of an activated carbon of Example 1 calculated by the QSDFT method.

An activated carbon of the present invention will be hereinafter described in detail.

In the activated carbon of the present invention, a pore volume A of pores with a size of 1.0 nm or less, of pore volumes calculated by the QSDFT method, is 0.3 cc/g or more, and a pore volume B of pores with a size of 3.0 nm or more and 3.5 nm or less, of pore volumes calculated by the QSDFT method, is 0.009 cc/g or more.

In order to impart a high total trihalomethane filtration capacity even at a high SV, it is important that the pore volume of pores with a size of 1.0 nm or less fall in the specific range, and the pore volume of pores with a size of 3.0 nm or more and 3.5 nm or less fall in the specific range. Based on research by the present inventors, it is believed that the pores with a size of 1.0 nm or less easily adsorb trihalomethane molecules, while the pores with a size of 3.0 nm or more and 3.5 nm or less contribute to not only the adsorption of trihalomethane molecules but also the diffusion of trihalomethane molecules into pores. As a result of extensive research by the present inventors, they found that the prior art has the problem that increasing the pore volume of pores with a size of 3.0 nm or more and 3.5 nm or less reduces the pore volume of pores with a size of 1.0 nm or less. That is, in the activated carbons disclosed in Patent Literatures 1 and 2 described above, the mesopores are increased, whereas the pore volume of pores with a size of 1.0 nm or less is reduced. It has been clarified that because of this, the activated carbons cannot sufficiently exhibit a high total trihalomethane filtration capacity at a high SV.

In contrast, the activated carbon of the present invention, which has an increased pore volume of pores with a size of 3.0 nm or more and 3.5 nm or less, while maintaining an increased pore volume of pores with a size of 1.0 nm or less, is obtained only when iron (Fe) is selected as the metal to be incorporated into an activated carbon precursor, and $CO_2$ is selected as the gas to be used for activating the activated carbon precursor, and then the activated carbon precursor is activated. The activated carbon can thereby exhibit a high total trihalomethane filtration capacity even at a high SV.

In the present invention, the pore volume of pores with a specific range of sizes is calculated by the QSDFT method. The QSDFT (Quenched Solid Density Functional Theory) method is an analytical technique for analyzing pore sizes of geometrically and chemically disordered microporous and mesoporous carbons. This technique can calculate pore size distributions from about 0.5 nm up to about 40 nm. The QSDFT method provides a significant improvement in the accuracy of pore size distribution analysis, by explicitly taking into account the effects of pore surface roughness and heterogeneity. In the present invention, nitrogen adsorption isotherm measurement is performed using "AUTOSORB-1-MP" available from Quantachrome, and pore size distribution analysis is performed using the QSDFT method. The pore volume of pores with a specific range of sizes can be calculated by calculating a pore size distribution by applying the calculation model, $N_2$ at 77K on carbon [slit pore, QSDFT equilibrium model], to a nitrogen desorption isotherm measured at a temperature of 77 K.

In the activated carbon of the present invention, the pore volume A of pores with a size of 1.0 nm or less, of pore volumes calculated by the QSDFT method, is 0.3 cc/g or more. In order to easily impart a higher total trihalomethane filtration capacity, even in water treatment by passing water at a high superficial velocity (SV), the pore volume A is preferably 0.33 cc/g or more and 0.50 cc/g or less, and more preferably 0.35 cc/g or more and 0.45 cc/g or less. Furthermore, in order for a higher filtration capacity for chloroform, among total trihalomethanes, to be exhibited, the pore volume A is preferably 0.35 cc/g or more and 0.50 cc/g or less, and more preferably 0.38 cc/g or more and 0.45 cc/g or less.

In the activated carbon of the present invention, the pore volume B of pores with a size of 3.0 nm or more and 3.5 nm or less, of pore volumes calculated by the QSDFT method, is 0.009 cc/g or more. In order to easily impart a higher total trihalomethane filtration capacity, even in water treatment by passing water at a high superficial velocity (SV), the pore volume B is preferably 0.009 cc/g or more and cc/g or less, and more preferably 0.009 cc/g or more and 0.016 cc/g or less. Furthermore, in order for a higher filtration capacity for chloroform, among total trihalomethanes, to be exhibited, the pore volume A is preferably 0.009 cc/g or more and 0.025 cc/g or less, and more preferably 0.014 cc/g or more and 0.016 cc/g or less.

In order for the activated carbon of the present invention to easily have a higher pore volume A of pores with a size of 1.0 nm or less, and easily have a higher total trihalomethane filtration capacity, even in water treatment by passing water at a high superficial velocity (SV), it is preferred that a pore volume C of pores with a size of 2.0 nm or more and 3.0 nm or less, of pore volumes calculated by the QSDFT method, be 0.05 cc/g or less. In conventional activated carbons, increasing the pore volume of mesopores causes further activation of previously formed pores with a size of 1.0 nm or less. These pores develop to a size above 1.0 nm, for example, 2.0 nm or more and 3.0 nm or less. Consequently, the pore volume A of pores with a size of 1.0 nm or less decreases. Therefore, by setting the pore volume C of pores with a size of 2.0 nm or more and 3.0 nm or less to 0.05 cc/g or less, it is possible to reduce increases in the pore size of previously formed pores with a size of 1.0 nm or less, allowing the pore volume A of pores with a size of 1.0 nm or less to increase. This pore distribution may be achieved by, for example, selecting iron (Fe) as the metal to be incorporated into an activated carbon precursor, and selecting $CO_2$ as the gas to be used for activating the activated carbon precursor, and then activating the activated carbon precursor.

In order for the activated carbon of the present invention to easily have a higher total trihalomethane filtration capacity, even in water treatment by passing water at a high superficial velocity (SV), a pore volume of pores with a size of 0.65 nm or less, of pore volumes calculated by the QSDFT method, is preferably 0.03 cc/g or more and 0.25 cc/g or less. Furthermore, in order for a higher filtration capacity for chloroform, among total trihalomethanes, to be exhibited, the pore volume of pores with a size of 0.65 nm or less is preferably 0.03 cc/g or more and 0.08 cc/g or less.

In order for the activated carbon of the present invention to easily have a higher total trihalomethane filtration capacity, even in water treatment by passing water at a high superficial velocity (SV), a pore volume of pores with a size of 0.8 nm or less, of pore volumes calculated by the QSDFT method, is, for example, 0.03 cc/g or more and 0.40 cc/g or less, and preferably 0.15 cc/g or more and 0.40 cc/g or less. Furthermore, in order for a higher filtration capacity for chloroform, among total trihalomethanes, to be exhibited, the pore volume of pores with a size of 0.8 nm or less is preferably 0.15 cc/g or more and 0.20 cc/g or less.

In order for the activated carbon of the present invention to easily have a higher total trihalomethane filtration capacity, even in water treatment by passing water at a high superficial velocity (SV), a pore volume of pores with a size of 1.5 nm or less, of pore volumes calculated by the QSDFT method, is preferably 0.3 cc/g or more and 0.6 cc/g or less, and more preferably 0.3 cc/g or more and 0.53 cc/g or less. Furthermore, in order for a higher filtration capacity for chloroform, among total trihalomethanes, to be exhibited, the pore volume of pores with a size of 1.5 nm or less is preferably 0.46 cc/g or more and 0.55 cc/g or less.

In order for the activated carbon of the present invention to easily have a higher total trihalomethane filtration capacity, even in water treatment by passing water at a high superficial velocity (SV), a pore volume of pores with a size of 2.0 nm or less, of pore volumes calculated by the QSDFT method, is preferably 0.3 cc/g or more and 0.6 cc/g or less, and more preferably 0.3 cc/g or more and 0.53 cc/g or less. Furthermore, in order for a higher filtration capacity for chloroform, among total trihalomethanes, to be exhibited, the pore volume of pores with a size of 2.0 nm or less is preferably 0.46 cc/g or more and 0.55 cc/g or less.

In order for the activated carbon of the present invention to easily have a higher total trihalomethane filtration capacity, even in water treatment by passing water at a high superficial velocity (SV), a pore volume of pores with a size of 3.5 nm or more, of pore volumes calculated by the QSDFT method, is preferably 0.03 cc/g or less, more preferably 0.015 cc/g or less, and particularly preferably 0.001 cc/g or more and 0.015 cc/g or less. Furthermore, in order for a higher filtration capacity for chloroform, among total trihalomethanes, to be exhibited, the pore volume of pores with a size of 3.5 nm or more is preferably 0.006 cc/g or more and 0.015 cc/g or less.

In order for the activated carbon of the present invention to easily have a higher total trihalomethane filtration capacity, even in water treatment by passing water at a high superficial velocity (SV), a pore volume of pores with a size of 2.0 nm or more, of pore volumes calculated by the QSDFT method, is preferably 0.08 cc/g or less, and more preferably 0.01 cc/g or more and 0.05 cc/g or less. Furthermore, in order for a higher filtration capacity for chloroform, among total trihalomethanes, to be exhibited, the pore volume of pores with a size of 2.0 nm or more is preferably 0.03 cc/g or more and 0.05 cc/g or less.

In order for the activated carbon of the present invention to easily have a higher total trihalomethane filtration capacity, even in water treatment by passing water at a high superficial velocity (SV), a pore volume of pores with a size of 0.65 nm or more and 1.0 nm or less, of pore volumes calculated by the QSDFT method, is preferably 0.15 cc/g or more and 0.40 cc/g or less. Furthermore, in order for a higher filtration capacity for chloroform, among total trihalomethanes, to be exhibited, the pore volume of pores with a size of 0.65 nm or more and 1.0 nm or less is preferably 0.33 cc/g or more and 0.40 cc/g or less.

The activated carbon of the present invention preferably has a specific surface area (value measured by the BET method (single-point method) using nitrogen as the adsorbate) of about 500 to 1800 m$^2$/g, and more preferably about 800 to 1500 m$^2$/g. A total pore volume of the activated carbon calculated by the QSDFT method is preferably about 0.33 to 1.50 cc/g, and more preferably about 0.35 to 0.60 cc/g.

In order for the activated carbon of the present invention to easily have a higher total trihalomethane filtration capacity, even in water treatment by passing water at a high superficial velocity (SV), a proportion of the pore volume A relative to the total pore volume (pore volume A/total pore volume) is, for example, 0.40 to 0.95, preferably 0.60 to 0.89, and more preferably 0.70 to 0.85. Furthermore, in order for a higher filtration capacity for chloroform, among total trihalomethanes, to be exhibited, the proportion is preferably 0.65 to 0.75.

In order for the activated carbon of the present invention to easily have a higher total trihalomethane filtration capacity, even in water treatment by passing water at a high superficial velocity (SV), a proportion of the pore volume B relative to the total pore volume (pore volume B/total pore volume) is, for example, 0.015 to 0.04.

In order for the activated carbon of the present invention to easily have a higher total trihalomethane filtration capacity, even in water treatment by passing water at a high superficial velocity (SV), a ratio of the pore volume B to the pore volume A (pore volume B/pore volume A) is, for example, 0.01 to 0.08, and preferably 0.02 to 0.05.

In order for the activated carbon of the present invention to easily have a higher total trihalomethane filtration capacity, even in water treatment by passing water at a high superficial velocity (SV), a proportion of the pore volume of pores with a size of 2.0 nm or less, of pore volumes calculated by the QSDFT method, relative to the total pore volume (pore volume of pores with a size of 2.0 nm or less/total pore volume) is preferably 0.90 to 0.98, and more preferably 0.93 to 0.96. The proportion may also be above 0.95, or even 0.96 or more. Furthermore, in order for a higher filtration capacity for chloroform, among total trihalomethanes, to be exhibited, the proportion is preferably 0.92 to 0.94.

In order for the activated carbon of the present invention to easily have a higher total trihalomethane filtration capacity, even in water treatment by passing water at a high superficial velocity (SV), a proportion of the pore volume of pores with a size of 2.0 nm or more, of pore volumes calculated by the QSDFT method, relative to the total pore volume (pore volume of pores with a size of 2.0 nm or more/total pore volume) is preferably 0.02 to 0.10, and more preferably 0.04 to 0.07. The proportion may also be less than 0.05, or even 0.04 or less. Furthermore, in order for a higher filtration capacity for chloroform, among total trihalomethanes, to be exhibited, the proportion is preferably 0.06 to 0.08.

In order for the activated carbon of the present invention to easily have a higher total trihalomethane filtration capacity, even in water treatment by passing water at a high superficial velocity (SV), a proportion of the pore volume A of pores with a size of 1.0 nm or less, relative to the pore volume of pores with a size of 2.0 nm or less, of pore volumes calculated by the QSDFT method (pore volume A of pores with a size of 1.0 nm or less/pore volume of pores with a size of 2.0 nm or less) is, for example, 0.50 to 0.95, and preferably 0.70 to 0.89.

In order for the activated carbon of the present invention to easily have a higher total trihalomethane filtration capacity, even in water treatment by passing water at a high superficial velocity (SV), a proportion of the pore volume of pores with a size of 1.5 nm or less, of pore volumes calculated by the QSDFT method, relative to the total pore volume (pore volume of pores with a size of 1.5 nm or less/total pore volume) is preferably 0.85 or more, and more preferably 0.90 to 0.96. Furthermore, in order for a higher filtration capacity for chloroform, among total trihalomethanes, to be exhibited, the proportion is preferably 0.90 to 0.92.

As described below, in the method of the present invention, the main raw material of the activated carbon precursor (i.e., the raw material from which the activated carbon of the present invention is derived) is not limited, and examples include infusibilized or carbonized organic materials and infusible resins such as phenolic resins. Examples of the organic materials include polyacrylonitrile, pitch, polyvinyl alcohol, and cellulose. Among the above, the activated carbon of the present invention is preferably derived from pitch, and is more preferably derived from coal pitch.

The activated carbon precursor of the activated carbon of the present invention contains an iron compound to achieve the specific pore size distribution described above. The activated carbon of the present invention may contain elemental iron derived from the iron compound contained in the activated carbon precursor and/or the iron compound. A (total) mass proportion of the elemental iron and the iron compound contained in the activated carbon, relative to the total mass of the activated carbon of the present invention, is, for example, 0.1 to 1.0% by mass, and preferably 0.15 to 0.3% by mass. The proportion represents the proportion in terms of elemental iron (i.e., iron content) measured using an ICP emission spectrometer (model number: 715-ES available from Varian Inc.). The activated carbon of the present invention may be washed after the activation. At this time, the concentration of elemental iron and/or the iron compound present on the surface of the activated carbon may be lower than that present inside the activated carbon. That is, the activated carbon of the present invention contains elemental iron and/or an iron compound, and may have a concentration of elemental iron and the iron compound inside the activated carbon that is higher than that on the surface of the activated carbon.

Examples of forms of the activated carbon of the present invention include, but are not limited to, a granular activated carbon, a powdered activated carbon, and a fibrous activated carbon. A fibrous activated carbon is preferred because of the processability for processing for use as a filter and the rate of adsorption for use as a water purifier. The fibrous activated carbon preferably has an average fiber diameter of 30 μm or less, and more preferably about 5 to 20 μm. The average fiber diameter of the fibrous activated carbon of the present invention represents the value measured using an image processing fiber diameter measurement apparatus (in accordance with JIS K 1477). The particle diameter of the granular activated carbon or the powdered activated carbon may be such that the cumulative volume percentage $D_{50}$ measured by the laser diffraction/scattering method is 0.01 to 5 mm, for example.

In the activated carbon of the present invention, the pore volume A of pores with a size of 1.0 nm or less, of pore volumes calculated by the QSDFT method, is 0.3 cc/g or more, and the pore volume B of pores with a size of 3.0 nm or more and 3.5 nm or less, of pore volumes calculated by the QSDFT method, is 0.009 cc/g or more, and therefore, the activated carbon has a high total trihalomethane filtration capacity, even in water treatment by passing water at a high superficial velocity (SV). The total trihalomethane filtration capacity of the activated carbon of the present invention, in water treatment by passing water at a high superficial velocity (SV), is, for example, 45 to 90 L/g, and preferably 60 to 80 L/g, at an SV of 3000 $h^{-1}$, for example.

The total trihalomethane filtration capacity (L/g) is measured using the following method: The activated carbon is dried in a dryer at 105° C. for 2 hours or more, and then 3.0 g of the activated carbon is taken as a sample and beaten in a mixer. Thereafter, the activated carbon is packed into a glass column. The glass column is 25 mm in diameter, and packed to a height of 41 mm. Based on "Testing methods for household water purifiers" as specified in JIS-S-3201, sample water having a total trihalomethane ($CHCl_3$:$CHCl_2Br$:$CHClBr_2$:$CHBr_3$=45:30:20:5) concentration of 100±20 ppb is prepared, and the sample water is controlled to a water temperature of 20±1° C., and passed through the activated carbon column at a superficial velocity of 3000 $h^{-1}$. The concentrations in the sample water and filtrate are measured using a non-radiation source-type electron capture detector (GC7000EN available from J-SCIENCE LAB Co., Ltd.), using the headspace method. The sample water is continuously passed until the total trihalomethane removal rate for the filtrate decreases below 80%, and the amount of passed water (L/g) at a removal rate of 80% is determined as the total trihalomethane adsorption capacity of the activated carbon.

The chloroform filtration capacity of the activated carbon of the present invention, in water treatment by passing water at a high superficial velocity (SV), is, for example, 45 to 90 L/g, and preferably 50 to 70 L/g, at an SV of 3000 $h^{-1}$, for example.

The chloroform filtration capacity (L/g) is measured using the following method: The activated carbon is dried in a dryer at 105° C. for 2 hours or more, and then 3.0 g of the activated carbon is taken as a sample and beaten in a mixer. Thereafter, the activated carbon is packed into a glass column. The glass column is mm in diameter, and packed to a height of 41 mm. Based on "Testing methods for household water purifiers" as specified in JIS-S-3201, sample water having a chloroform concentration of 60±12 ppb is prepared, and the sample water is controlled to a water temperature of 20±1° C., and passed through the activated carbon column at a superficial velocity of 3000 $h^{-1}$. The concentrations in the sample water and filtrate are measured using a non-radiation source-type electron capture detector (GC7000EN available from J-SCIENCE LAB Co., Ltd.), using the headspace method. The sample water is continuously passed until the chloroform removal rate for the filtrate decreases below 80%, and the amount of passed water (L/g) at a removal rate of 80% is determined as the chloroform adsorption capacity of the activated carbon.

Next, a method for producing the activated carbon of the present invention will be described in detail.

The method for producing the activated carbon of the present invention preferably comprises the step of activating an activated carbon precursor comprising 0.1 to 1.5% by mass of iron at a temperature of 900 to 1000° C. in an atmosphere having a $CO_2$ concentration of 90% by volume or more.

Conventionally, activated carbons for water purification applications, particularly for removing low-molecular-weight organic halogen compounds such as trihalomethanes, are typically produced using a method in which activated carbon precursors are activated in an atmosphere with a high steam content. For example, Patent Literature 1 discloses, as an implementable method, activating a fullerene used as an activated carbon precursor in an atmosphere in which steam/nitrogen=50/50 (volume ratio). Patent Literature 2 also discloses a method in which an activated carbon precursor containing at least one metal component from Mg, Mn, Fe, Y, Pt, and Gd is activated in an atmosphere containing nitrogen and saturated steam, in order for the volume of pores with a diameter of 30 Å or more and less than 50 Å to fall in a specific range. With these methods, however, increasing the volume of mesopores reduces the pore volume of pores with a size of 1.0 nm or less, and the resulting activated carbons cannot exhibit a sufficient filtration capacity for total trihalomethanes at a high superficial velocity.

In contrast, in the method for producing the activated carbon of the present invention, the activated carbon precursor comprising 0.1 to 1.5% by mass of iron is activated using an activation gas containing 90% by volume or more of $CO_2$, which reacts with the activated carbon precursor more slowly than steam. This allows the pore volume of pores with a size of 3.0 nm or more and 3.5 nm or less to be controlled in the specific range, while allowing the pore volume of pores with a size of 1.0 nm or less to be maintained.

In the method for producing the activated carbon of the present invention, the main raw material of the activated carbon precursor is not limited. Examples include infusibilized or carbonized organic materials and infusible resins such as phenolic resins. Examples of the organic materials include polyacrylonitrile, pitch, polyvinyl alcohol, and cellulose. Pitch, particularly coal pitch, is preferred in terms of the theoretical carbonization yield during carbonization.

In the method for producing the activated carbon of the present invention, the iron content in the activated carbon precursor is preferably 0.5 to 1.0% by mass. Iron can be incorporated by mixing elemental iron or an iron compound into the raw material. Examples of the iron compound include compounds containing iron as a constitutional metal element, for example, inorganic metal compounds such as a metal oxide, a metal hydroxide, a metal halide, and a metal sulfate; metal salts of organic acids such as acetic acid; and organometallic compounds. Examples of organometallic compounds include a metal acetylacetonate and an aromatic metal compound. In order to allow the metal to be highly dispersed in the activated carbon precursor, and obtain an activated carbon having a high total trihalomethane filtration capacity, even in water treatment by passing water at a high superficial velocity (SV), an organometallic compound is preferred among the above, and a metal complex having a β-diketone-type compound as a ligand is preferred as the organometallic compound. Examples of β-diketone-type compounds include those having the structures represented by formulae (1) to (3) shown below, and specific examples include acetylacetone.

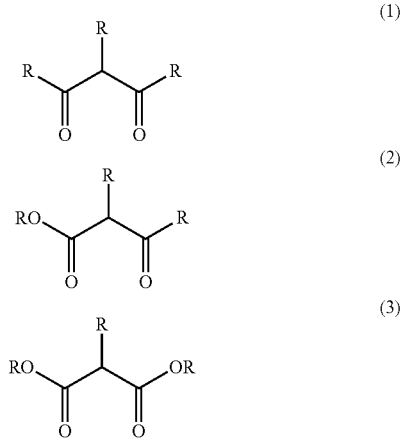

In the method of the present invention, the atmosphere for activation has a $CO_2$ concentration of 90% by volume or more, preferably 95% by volume or more, and more preferably 99% by volume or more. As described above, the reaction proceeds slowly using $CO_2$ as the activation gas, and therefore, the pore size distribution is more easily adjusted as the $CO_2$ concentration is increased, allowing the activated carbon of the present invention to be more easily obtained.

Examples of components other than $CO_2$ in the atmosphere for activation include $N_2$, $O_2$, $H_2$, $H_2O$, and CO.

In the method for producing the activated carbon of the present invention, the atmospheric temperature for activation is typically about 900 to 1000° C., and preferably about 900 to 980° C. The activation time may be adjusted to give a predetermined pore size distribution, according to the main raw material of the activated carbon precursor, the iron compound content, the $CO_2$ concentration in the activation gas, and the like. For example, when pitch having a softening point of 275 to 288° C. is used as the main raw material of the activated carbon precursor, the iron compound content in the activated carbon precursor is 0.1 to 1.5 parts by mass, and the $CO_2$ concentration is 100% by volume, the activation may be carried out at an atmospheric temperature for activation of 900 to 1000° C., for an activation time of 20 to 70 minutes.

EXAMPLES

The present invention will be hereinafter described in detail with reference to examples and comparative examples; however, the present invention is not limited to the examples.

For each of the examples and comparative examples, evaluations were conducted using the following methods:

(1) Iron Content (% by Mass) in Activated Carbon Precursor (Infusibilized Pitch Fiber)

The pitch fiber was subjected to an ashing treatment, the ash was dissolved in an acid, and the proportion in terms of elemental iron as measured using an ICP emission spectrometer (model number: 715-ES available from Varian Inc.) was determined as the iron content.

(2) Metal Content (% by Mass) in Activated Carbon

The fibrous activated carbon was subjected to an ashing treatment, the ash was dissolved in an acid, and the proportion in terms of elemental iron as measured using an ICP emission spectrometer (model number: 715-ES available from Varian Inc.) was determined as the iron content.

Figure 2:
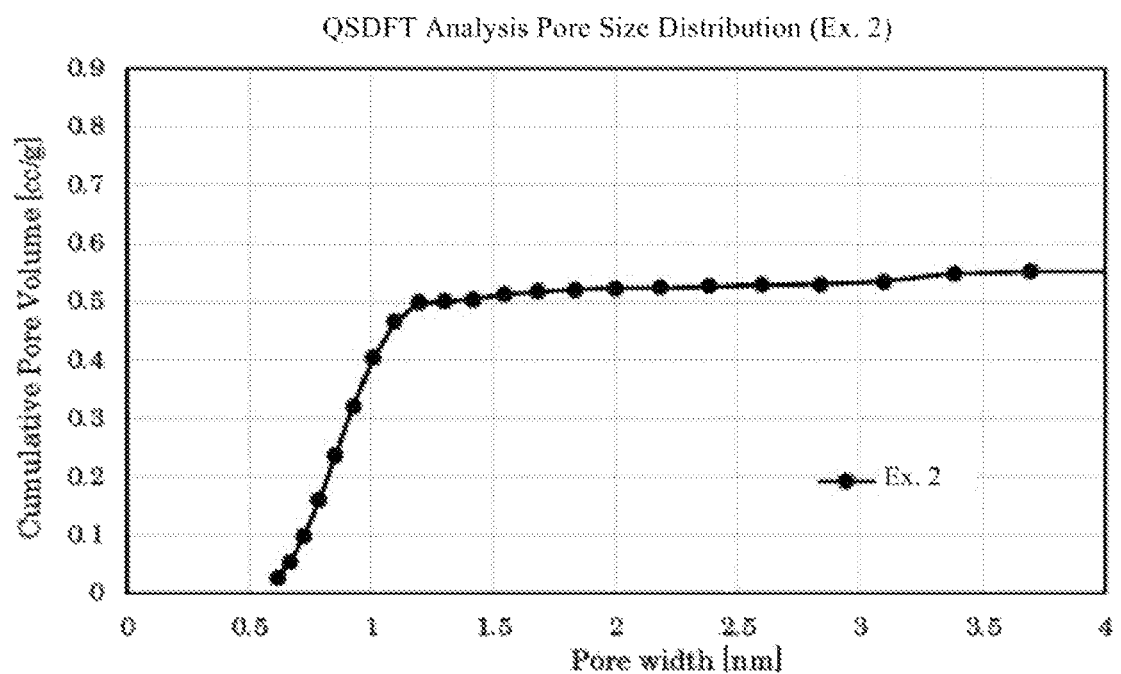
FIG. 2 is a graph showing a pore size distribution of an activated carbon of Example 2 calculated by the QSDFT method.
Figure 3:
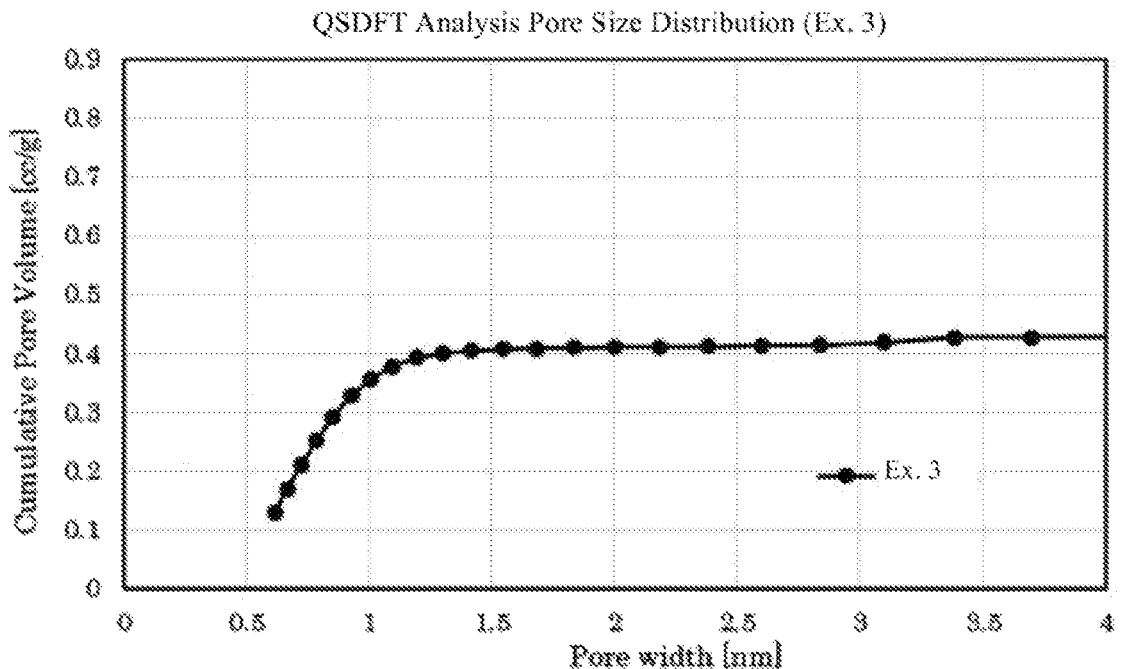
FIG. 3 is a graph showing a pore size distribution of an activated carbon of Example 3 calculated by the QSDFT method.
Figure 4:
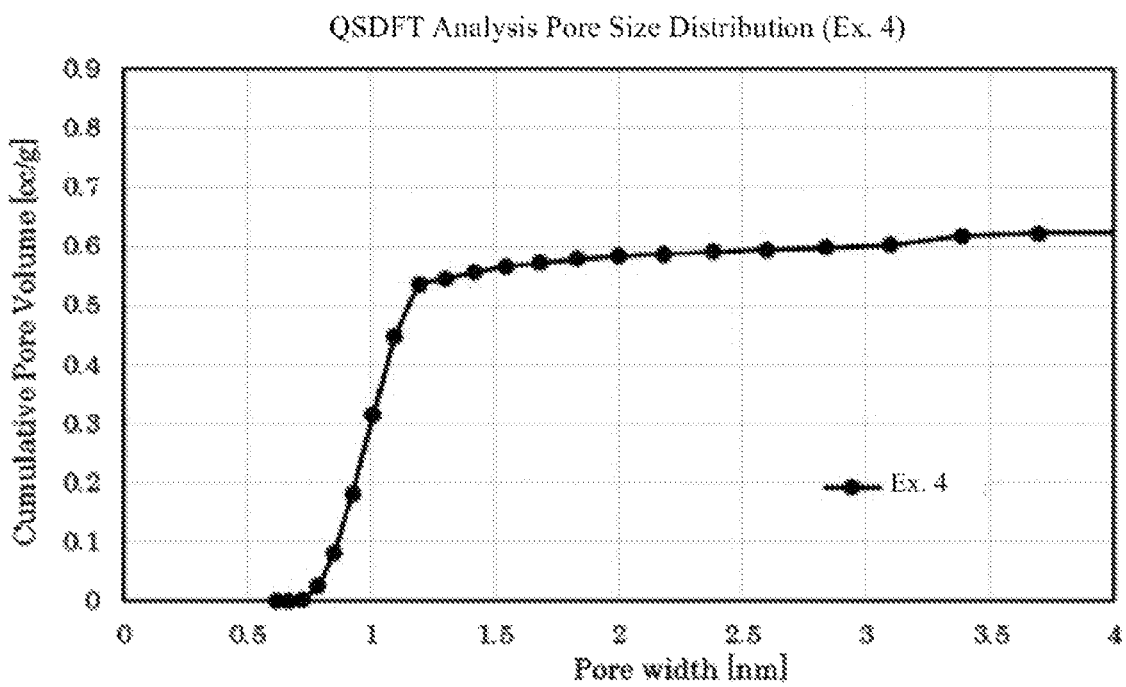
FIG. 4 is a graph showing a pore size distribution of an activated carbon of Example 4 calculated by the QSDFT method.
Figure 5:
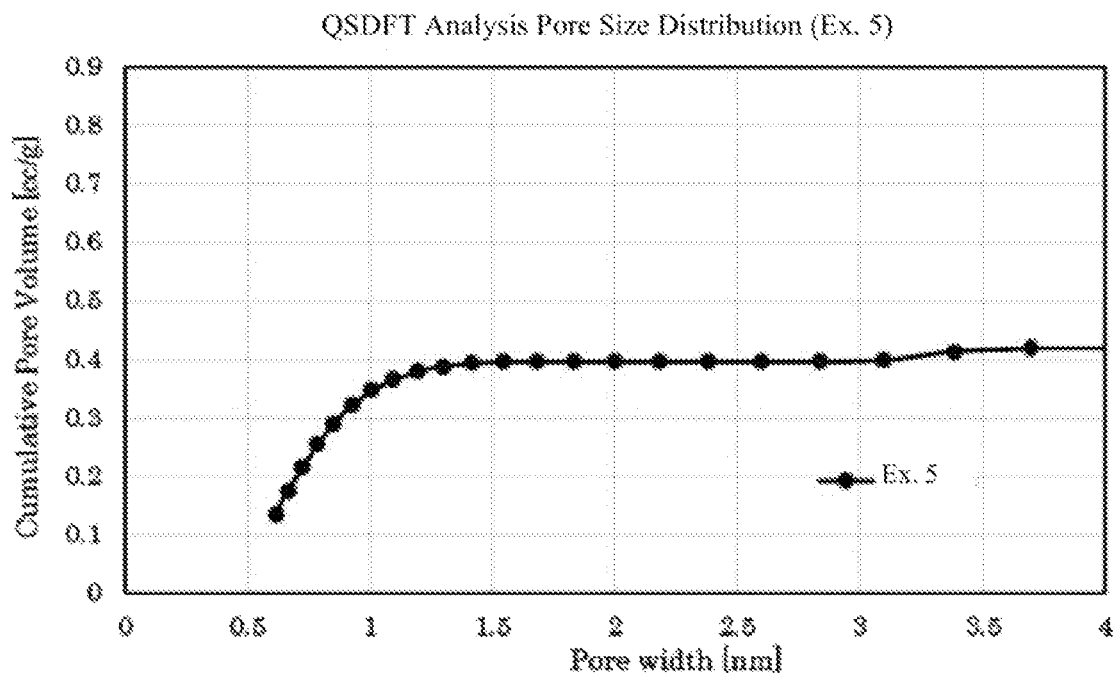
FIG. 5 is a graph showing a pore size distribution of an activated carbon of Example 5 calculated by the QSDFT method.
Figure 6:
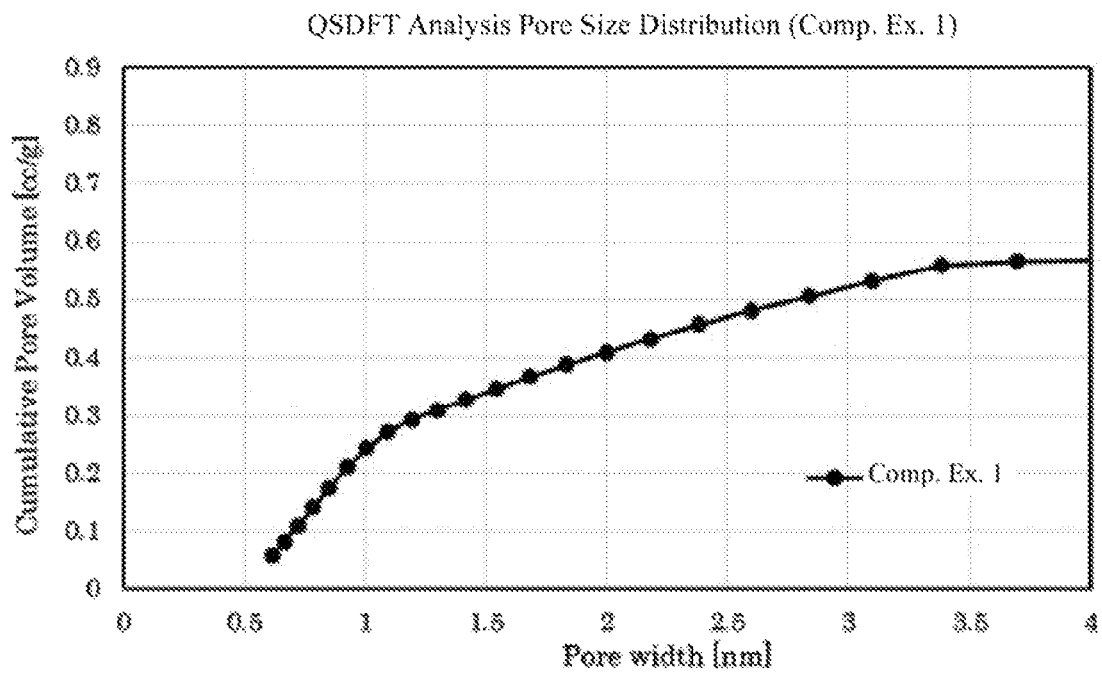
FIG. 6 is a graph showing a pore size distribution of an activated carbon of Comparative Example 1 calculated by the QSDFT method.
Figure 7:
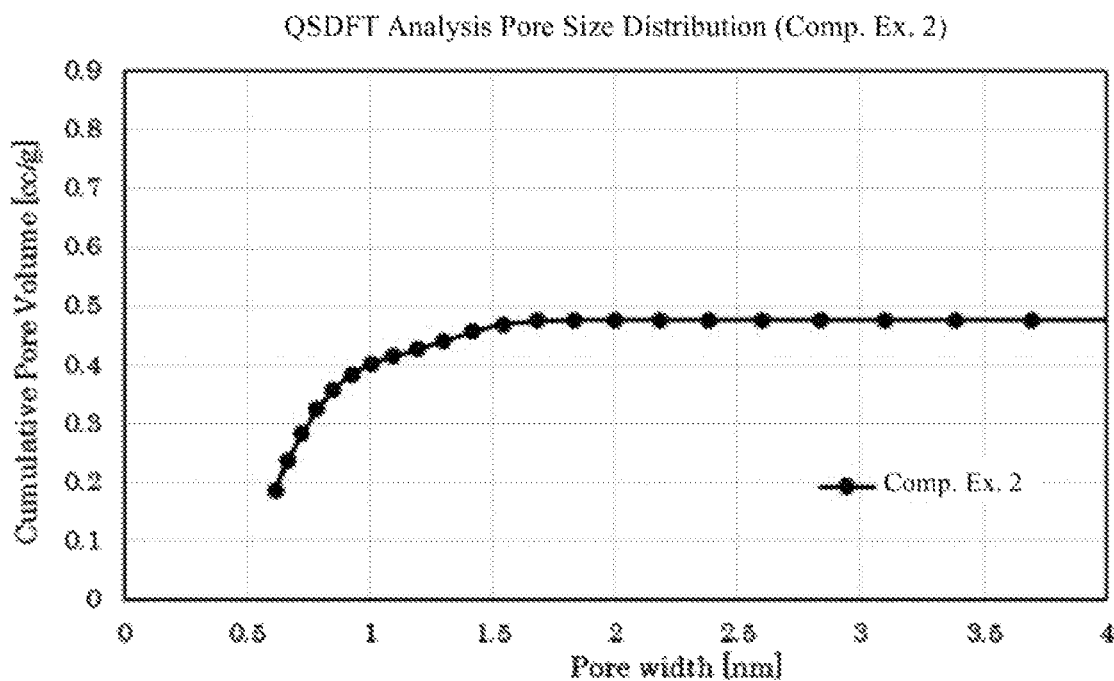
FIG. 7 is a graph showing a pore size distribution of an activated carbon of Comparative Example 2 calculated by the QSDFT method.
Figure 8:
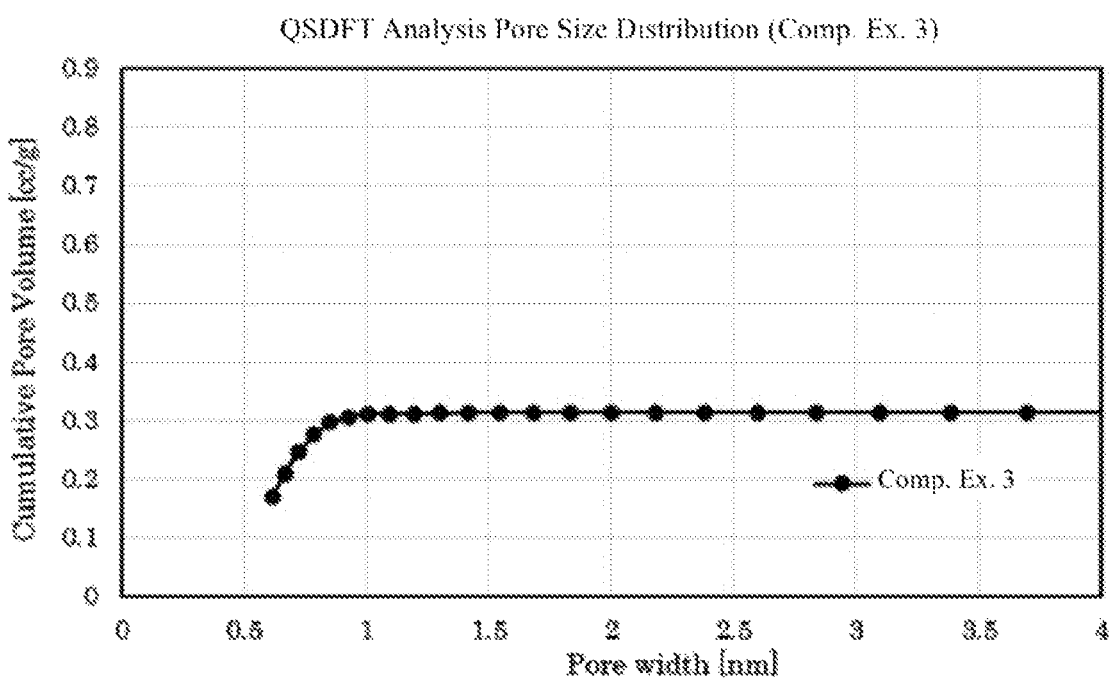
FIG. 8 is a graph showing a pore size distribution of an activated carbon of Comparative Example 3 calculated by the QSDFT method.
Figure 9:
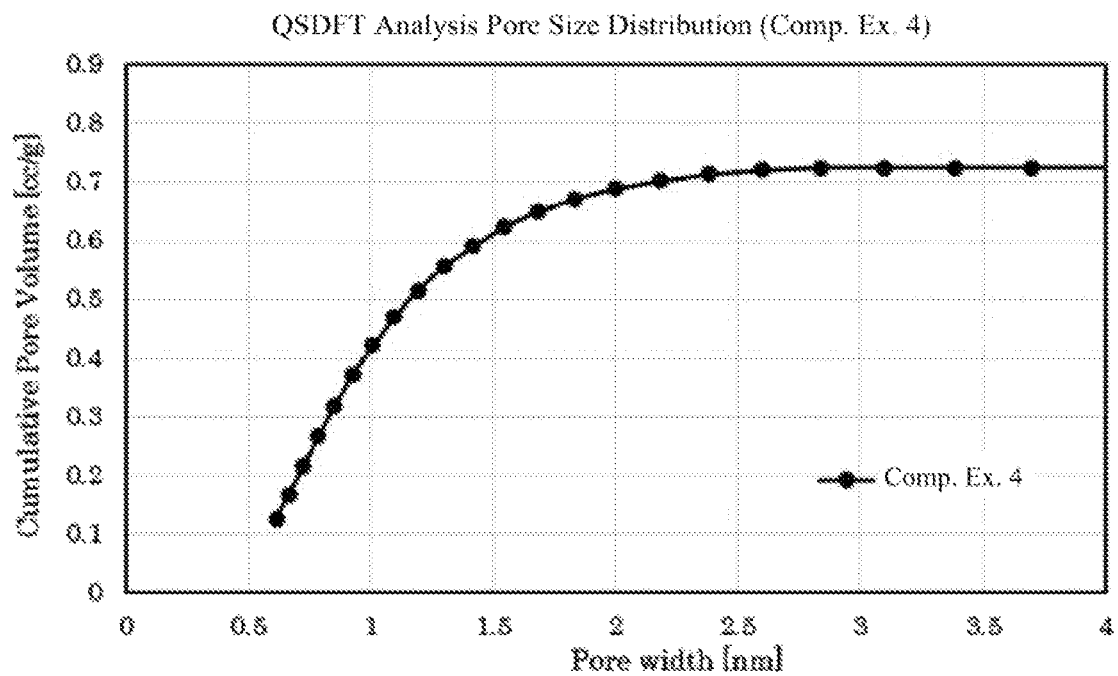
FIG. 9 is a graph showing a pore size distribution of an activated carbon of Comparative Example 4 calculated by the QSDFT method.
Figure 10:
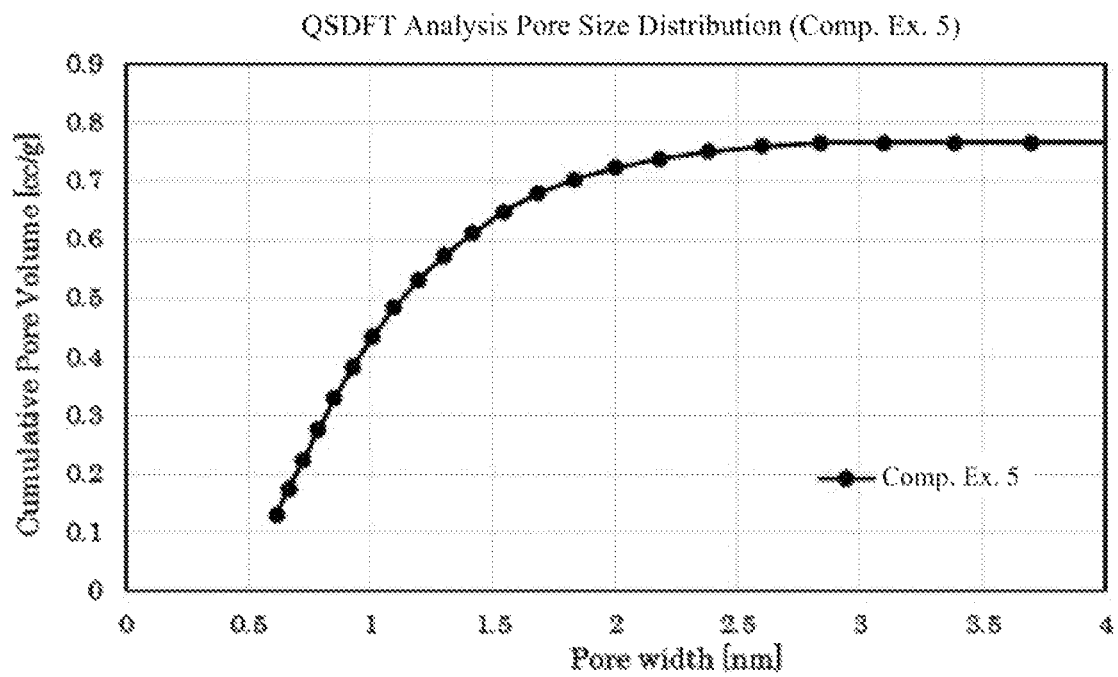
FIG. 10 is a graph showing a pore size distribution of an activated carbon of Comparative Example 5 calculated by the QSDFT method.
Figure 11:
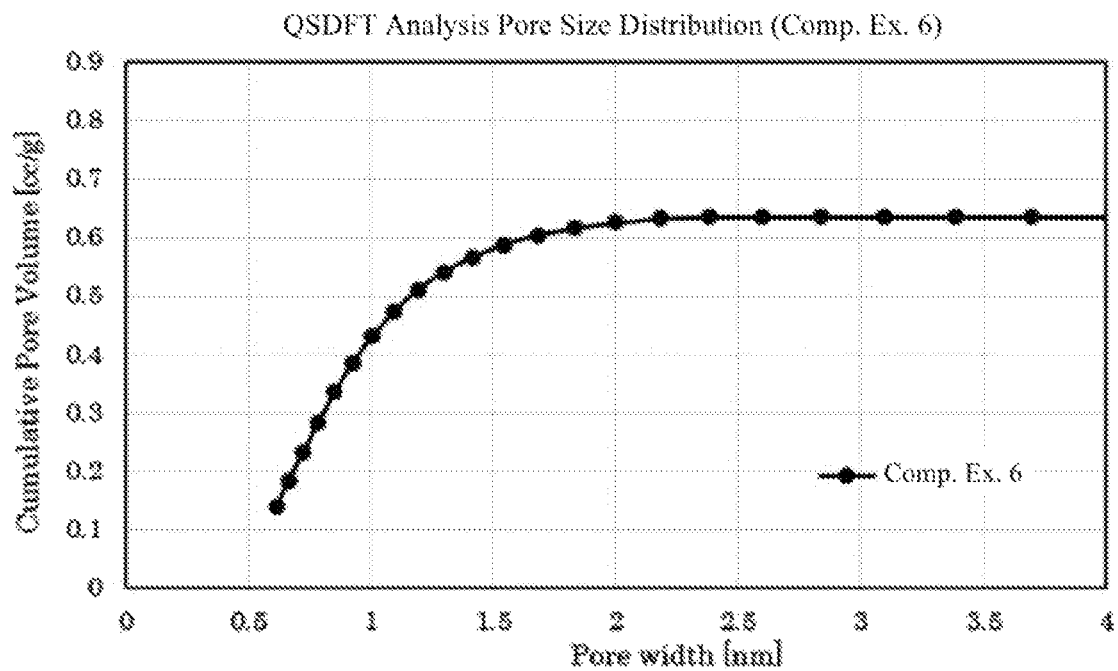
FIG. 11 is a graph showing a pore size distribution of an activated carbon of Comparative Example 6 calculated by the QSDFT method.

(3) Pore Volumes (Cc/g), Specific Surface Area (m²/g), and Fiber Diameter (μm) of Fibrous Activated Carbon The physical property values of pores were measured based on a nitrogen adsorption isotherm at 77 K, using "AUTOSORB-1-MP" available from Quantachrome. The specific surface area was calculated by the BET method, from the measurement point at a relative pressure of 0.1. The total pore volume and the pore volume of pores with each range of sizes shown in Table 1 were analyzed by calculating a pore size distribution by applying the calculation model, $N_2$ at 77K on carbon [slit pore, QSDFT equilibrium model], to the measured nitrogen desorption isotherm. Specifically, the pore volume of pores with each range of sizes shown in Table 1 represents the reading from the graph showing the pore size distribution shown in each of FIGS. 1 to 11, or the value calculated based on the reading. More specifically, the pore volume of pores with a size of 0.65 nm or less represents the reading of Cumulative Pore Volume (cc/g) at a Pore Width of 0.65 nm along the horizontal axis on the pore size distribution diagram. Similarly, the pore volume of pores with a size of 0.8 nm or less, the pore volume A of pores with a size of 1.0 nm or less, the pore volume of pores with a size of 1.5 nm or less, the pore volume of pores with a size of 2.0 nm or less, the pore volume of pores with a size of 2.5 nm or less, the pore volume of pores with a size of 3.0 nm or less, and the pore volume of pores with a size of 3.5 nm or less were determined. The pore volume B of pores with a size of 3.0 nm or more and 3.5 nm or less was calculated by subtracting the pore volume of pores with a size of 3.0 nm or less from the pore volume of pores with a size of 3.5 nm or less. The pore volume C of pores with a size of 2.0 nm or more and 3.0 nm or less was calculated by subtracting the pore volume of pores with a size of 2.0 nm or less from the pore volume of pores with a size of 3.0 nm or less. The pore volume of pores with a size of 3.5 nm or more was calculated by subtracting the pore volume of pores with a size of 3.5 nm or less from the total pore volume determined by the QSDFT method. The pore volume of pores with a size of 1.0 nm or more and 1.5 nm or less was calculated by subtracting the pore volume A of pores with a size of 1.0 nm or less from the pore volume of pores with a size of 1.5 nm or less. The pore volume of pores with a size of 1.0 nm or more and 2.0 nm or less was calculated by subtracting the pore volume A of pores with a size of 1.0 nm or less from the pore volume of pores with a size of 2.0 nm or less. The pore volume of pores with a size of 0.65 nm or more and 0.8 nm or less was calculated by subtracting the pore volume of pores with a size of 0.65 nm or less from the pore volume of pores with a size of 0.8 nm or less. The pore volume of pores with a size of 0.65 nm or more and 1.0 nm or less was calculated by subtracting the pore volume of pores with a size of 0.65 nm or less from the pore volume A of pores with a size of 1.0 nm or less. The pore volume of pores with a size of 0.8 nm or more and 1.5 nm or less was calculated by subtracting the pore volume of pores with a size of 0.8 nm or less from the pore volume of pores with a size of 1.5 nm or less. The pore volume of pores with a size of 1.5 nm or more and 2.5 nm or less was calculated by subtracting the pore volume of pores with a size of 1.5 nm or less from the pore volume of pores with a size of 2.5 nm or less. The pore volume of pores with a size of 2.0 nm or more was calculated by subtracting the pore volume of pores with a size of 2.0 nm or less from the total pore volume determined by the QSDFT method. The pore volume of pores with a size of 2.5 nm or more was calculated by subtracting the pore volume of pores with a size of 2.5 nm or less from the total pore volume determined by the QSDFT method.

(4) Fiber Diameter (μm) of Fibrous Activated Carbon

The measurement was performed using an image processing fiber diameter measurement apparatus (in accordance with JIS K 1477).

(5) Total Trihalomethane Filtration Capacity (L/g)

The fibrous activated carbon was dried in a dryer at 105° C. for 2 hours or more, and then 3.0 g of the activated carbon was taken as a sample and beaten in a mixer. Thereafter, the activated carbon was packed into a glass column. The glass column was 25 mm in diameter, and packed to a height of 41 mm. Based on "Testing methods for household water purifiers" as specified in JIS-S-3201, sample water having a total trihalomethane ($CHCl_3$:$CHCl_2Br$:$CHClBr_2$:$CHBr_3$=45:30:20:5) concentration of 100±20 ppb was prepared, and the sample water was controlled to a water temperature of 20±1° C., and passed through the activated carbon column at a superficial velocity of 3000 $h^{-1}$. The concentrations in the sample water and filtrate were measured using a non-radiation source-type electron capture detector (GC7000EN available from J-SCIENCE LAB Co., Ltd.), using the headspace method. The sample water was continuously passed until the total trihalomethane removal rate for the filtrate decreased below 80%, and the amount of passed water (L/g) at a removal rate of 80% was determined as the total trihalomethane adsorption capacity of the activated carbon.

(6) Chloroform Filtration Capacity (L/g)

The fibrous activated carbon was dried in a dryer at 105° C. for 2 hours or more, and then 3.0 g of the activated carbon was taken as a sample and beaten in a mixer. Thereafter, the activated carbon was packed into a glass column. The glass column was 25 mm in diameter, and packed to a height of 41 mm. Based on "Testing methods for household water purifiers" as specified in JIS-S-3201, sample water having a chloroform concentration of 60±12 ppb was prepared, and the sample water was controlled to a water temperature of 20±1° C., and passed through the activated carbon column at a superficial velocity of 3000 $h^{-1}$. The concentrations in the sample water and filtrate were measured using a non-radiation source-type electron capture detector (GC7000EN available from J-SCIENCE LAB Co., Ltd.), using the headspace method. The sample water was continuously passed until the chloroform removal rate for the filtrate decreased below 80%, and the amount of passed water (L/g) at a removal rate of 80% was determined as the chloroform adsorption capacity of the activated carbon.

Example 1

A mixture obtained by mixing 100 parts by mass of granular coal pitch having a softening point of 280° C. as an organic material with 0.9 part by mass of tris(2,4-pentanedionato)iron(III) (metal species: Fe) was fed into a melt extruder, where it was melted and mixed at a melting temperature of 320° C., and spun at a discharge rate of 16 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. The iron (Fe) content in the activated carbon precursor was 0.11% by mass.

The activated carbon precursor was activated by conducting a heat treatment at an atmospheric temperature of 950° C. for 25 minutes, while continuously introducing a gas having a $CO_2$ concentration of 100% by volume into an activation furnace, to obtain an activated carbon of Example 1. In the activated carbon, the pore volume A of pores with a size of 1.0 nm or less was 0.350 cc/g, the pore volume B of pores with a size of 3.0 nm or more and 3.5 nm or less was 0.012 cc/g, the iron content was 0.184% by mass, and the average fiber diameter was 13.9 μm.

Example 2

A mixture obtained by mixing 100 parts by mass of granular coal pitch having a softening point of 280° C. as an organic material with 0.9 part by mass of tris(2,4-pentanedionato)iron(III) (metal species: Fe) was fed into a melt extruder, where it was melted and mixed at a melting temperature of 320° C., and spun at a discharge rate of 16 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. The iron (Fe) content in the activated carbon precursor was 0.11% by mass.

The activated carbon precursor was activated by conducting a heat treatment at an atmospheric temperature of 950° C. for 40 minutes, while continuously introducing a gas having a $CO_2$ concentration of 100% by volume into an activation furnace, to obtain an activated carbon of Example 2. In the activated carbon, the pore volume A of pores with a size of 1.0 nm or less was 0.396 cc/g, the pore volume B of pores with a size of 3.0 nm or more and 3.5 nm or less was 0.016 cc/g, the iron content was 0.251% by mass, and the average fiber diameter was 13.6 μm.

Example 3

A mixture obtained by mixing 100 parts by mass of granular coal pitch having a softening point of 280° C. as an organic material with 0.7 part by mass of tris(2,4-pentanedionato)iron(III) (metal species: Fe) was fed into a melt extruder, where it was melted and mixed at a melting temperature of 320° C., and spun at a discharge rate of 16 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. The iron (Fe) content in the activated carbon precursor was 0.094% by mass.

The activated carbon precursor was activated by conducting a heat treatment at an atmospheric temperature of 950° C. for 40 minutes, while continuously introducing a gas having a $CO_2$ concentration of 100% by volume into an activation furnace, to obtain an activated carbon of Example 3. In the activated carbon, the pore volume A of pores with a size of 1.0 nm or less was 0.356 cc/g, the pore volume B of pores with a size of 3.0 nm or more and 3.5 nm or less was 0.009 cc/g, the iron content was 0.184% by mass, and the average fiber diameter was 13.8 μm.

Example 4

A mixture obtained by mixing 100 parts by mass of granular coal pitch having a softening point of 280° C. as an organic material with 0.9 part by mass of tris(2,4-pentanedionato)iron(III) (metal species: Fe) was fed into a melt extruder, where it was melted and mixed at a melting temperature of 320° C., and spun at a discharge rate of 16 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. The iron (Fe) content in the activated carbon precursor was 0.11% by mass.

The activated carbon precursor was activated by conducting a heat treatment at an atmospheric temperature of 950° C. for 50 minutes, while continuously introducing a gas having a $CO_2$ concentration of 100% by volume into an activation furnace, to obtain an activated carbon of Example 3. In the activated carbon, the pore volume A of pores with a size of 1.0 nm or less was 0.303 cc/g, the pore volume B of pores with a size of 3.0 nm or more and 3.5 nm or less was 0.018 cc/g, the iron content was 0.318% by mass, and the average fiber diameter was 13.2 μm.

Example 5

A mixture obtained by mixing 100 parts by mass of granular coal pitch having a softening point of 280° C. as an organic material with 0.9 part by mass of tris(2,4-pentanedionato)iron(III) (metal species: Fe) was fed into a melt extruder, where it was melted and mixed at a melting temperature of 325° C., and spun at a discharge rate of 16 g/min to obtain a pitch fiber. The pitch fiber was subjected to an infusibilization treatment by gradually heating to 349° C. in the air, and holding for a total of 75 minutes, to obtain an infusibilized pitch fiber as an activated carbon precursor. The iron (Fe) content in the activated carbon precursor was 0.10% by mass.

The activated carbon precursor was activated by conducting a heat treatment at an atmospheric temperature of 950° C. for 40 minutes, while continuously introducing a gas having a $CO_2$ concentration of 100% by volume into an activation furnace, to obtain an activated carbon of Example 5. In the activated carbon, the pore volume A of pores with a size of 1.0 nm or less was 0.346 cc/g, the pore volume B of pores with a size of 3.0 nm or more and 3.5 nm or less was 0.019 cc/g, the iron content was 0.235% by mass, and the average fiber diameter was 13.4 μm.

Comparative Example 1

A test simulating Example 5 of Patent Literature 2 was conducted. Specifically, a mixture obtained by mixing 100 parts by mass of granular coal pitch having a softening point of 280° C. as an organic material with 1.3 parts by mass of tris(acetylacetonato)yttrium was fed into a melt extruder, where it was melted and mixed at a melting temperature of 320° C., and spun at a discharge rate of 20 g/min to obtain a pitch fiber. The pitch fiber was subjected to an infusibilization treatment by heating for 54 minutes, to 354° C. from ambient temperature in the air at a rate of 1 to to obtain an infusibilized pitch fiber as an activated carbon precursor. The yttrium content in the activated carbon precursor was 0.25% by mass.

The activated carbon precursor was activated by conducting a heat treatment at an atmospheric temperature of 900° C. for 20 minutes, while continuously introducing a gas having an $H_2O$ concentration of 100% by volume into an activation furnace, to obtain an activated carbon of Comparative Example 1. In the activated carbon, the pore volume A of pores with a size of 1.0 nm or less was 0.241 cc/g, the pore volume B of pores with a size of 3.0 nm or more and 3.5 nm or less was 0.042 cc/g, the yttrium content was 0.66% by mass, and the average fiber diameter was 16.5 μm.

Comparative Example 2

Granular coal pitch having a softening point of 280° C. as an organic material was fed into a melt extruder, where it was melted and mixed at a melting temperature of 320° C., and spun at a discharge rate of 20 g/min, to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. The iron content in the activated carbon precursor was 0% by mass.

The activated carbon precursor was activated by conducting a heat treatment at an atmospheric temperature of 875° C. for 40 minutes, while continuously introducing a gas having an $H_2O$ concentration of 100% by volume into an activation furnace, to obtain an activated carbon of Comparative Example 2. In the activated carbon, the pore volume A of pores with a size of 1.0 nm or less was 0.401 cc/g, the pore volume B of pores with a size of 3.0 nm or more and 3.5 nm or less was 0.000 cc/g, the iron content was 0% by mass, and the average fiber diameter was 16.7 μm.

Comparative Example 3

Granular coal pitch having a softening point of 280° C. as an organic material was fed into a melt extruder, where it was melted and mixed at a melting temperature of 320° C., and spun at a discharge rate of 20 g/min, to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. The iron content in the activated carbon precursor was 0% by mass.

The activated carbon precursor was activated by conducting a heat treatment at an atmospheric temperature of 950° C. for 60 minutes, while continuously introducing a gas having a $CO_2$ concentration of 100% by volume into an activation furnace, to obtain an activated carbon of Comparative Example 3. In the activated carbon, the pore volume A of pores with a size of 1.0 nm or less was 0.311 cc/g, the pore volume B of pores with a size of 3.0 nm or more and 3.5 nm or less was 0.000 cc/g, the iron content was 0% by mass, and the average fiber diameter was 18.5 μm.

Comparative Example 4

A mixture obtained by mixing 100 parts by mass of granular coal pitch having a softening point of 280° C. as an organic material with 0.3 part by mass of tris(acetylacetonato)yttrium was fed into a melt extruder, where it was melted and mixed at a melting temperature of 320° C., and spun at a discharge rate of 20 g/min to obtain a pitch fiber. The pitch fiber was subjected to an infusibilization treatment by heating for 54 minutes, to 354° C. from ambient temperature in the air at a rate of 1 to to obtain an infusibilized pitch fiber as an activated carbon precursor. The yttrium content in the activated carbon precursor was 0.06% by mass.

The activated carbon precursor was activated by conducting a heat treatment at an atmospheric temperature of 950° C. for 67 minutes, while continuously introducing a gas having a $CO_2$ concentration of 100% by volume into an activation furnace, to obtain an activated carbon of Comparative Example 4. In the activated carbon, the pore volume A of pores with a size of 1.0 nm or less was 0.418 cc/g, the pore volume B of pores with a size of 3.0 nm or more and 3.5 nm or less was 0.000 cc/g, the yttrium content was 0.17% by mass, and the average fiber diameter was 16.8 μm.

Comparative Example 5

A mixture obtained by mixing 100 parts by mass of granular coal pitch having a softening point of 280° C. as an organic material with 0.3 part by mass of tris(acetylacetonato)yttrium was fed into a melt extruder, where it was melted and mixed at a melting temperature of 320° C., and spun at a discharge rate of 20 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. The yttrium content in the activated carbon precursor was 0.06% by mass.

The activated carbon precursor was activated by conducting a heat treatment at an atmospheric temperature of 950° C. for 70 minutes, while continuously introducing a gas having a $CO_2$ concentration of 100% by volume into an activation furnace, to obtain an activated carbon of Comparative Example 5. In the activated carbon, the pore volume A of pores with a size of 1.0 nm or less was 0.431 cc/g, the pore volume B of pores with a size of 3.0 nm or more and 3.5 nm or less was 0.000 cc/g, the yttrium content was 0.18% by mass, and the average fiber diameter was 16.8 μm.

Comparative Example 6

A mixture obtained by mixing 100 parts by mass of granular coal pitch having a softening point of 280° C. as an organic material with 0.3 part by mass of tris(acetylacetonato)yttrium was fed into a melt extruder, where it was melted and mixed at a melting temperature of 320° C., and spun at a discharge rate of 20 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. The yttrium content in the activated carbon precursor was 0.06% by mass.

The activated carbon precursor was activated by conducting a heat treatment at an atmospheric temperature of 950° C. for 60 minutes, while continuously introducing a gas having a $CO_2$ concentration of 100% by volume into an activation furnace, to obtain an activated carbon of Comparative Example 6. In the activated carbon, the pore volume A of pores with a size of 1.0 nm or less was 0.429 cc/g, the pore volume B of pores with a size of 3.0 nm or more and 3.5 nm or less was 0.000 cc/g, the yttrium content was 0.15% by mass, and the fiber diameter was 18.2 μm.

Comparative Example 7

A mixture obtained by mixing 100 parts by mass of granular coal pitch having a softening point of 280° C. as an organic material with 1.0 part by mass of tris(acetylacetonato)yttrium was fed into a melt extruder, where it was melted and mixed at a melting temperature of 320° C., and spun at a discharge rate of 19 g/min to obtain a pitch fiber. The pitch fiber was subjected to an infusibilization treatment by heating for 54 minutes, to 354° C. from ambient temperature in the air at a rate of 1 to 30° C./minute, to obtain an infusibilized pitch fiber as an activated carbon precursor. The yttrium content in the activated carbon precursor was 0.16% by mass.

The activated carbon precursor was activated by conducting a heat treatment at an atmospheric temperature of 950° C. for 20 minutes, while continuously introducing a gas having a $CO_2$ concentration of 50% by volume and an $H_2O$ concentration of 50% by volume into an activation furnace, to obtain an activated carbon of Comparative Example 7. In the activated carbon, the pore volume A of pores with a size of 1.0 nm or less was 0.255 cc/g, the pore volume B of pores with a size of 3.0 nm or more and 3.5 nm or less was 0.034 cc/g, the yttrium content was 0.46% by mass, and the average fiber diameter was 14.6 μm.

Figure 12:
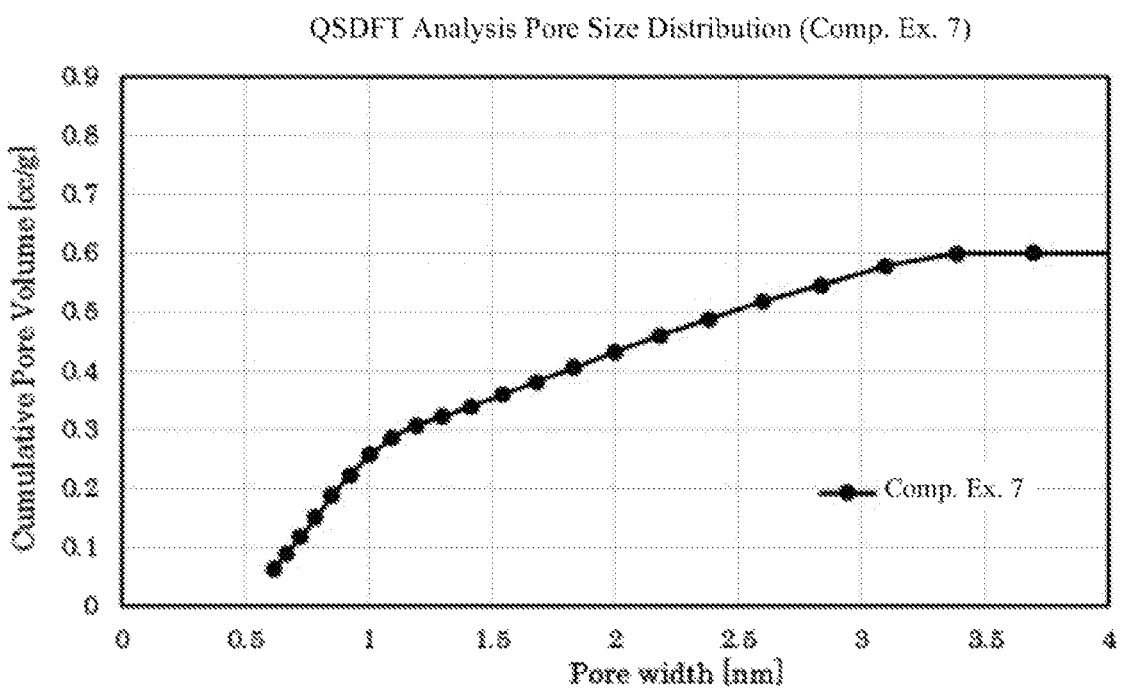
FIG. 12 is a graph showing a pore size distribution of an activated carbon of Comparative Example 7 calculated by the QSDFT method.

The physical properties of the activated carbons are shown in Tables 1 and 2. The pore size distribution diagrams of the activated carbons of Examples 1 to 5 and Comparative Examples 1 to 7 calculated by the QSDFT method are shown in FIGS. 1 to 12.

TABLE 1

| | | Ex. 1 | Ex. 2 | Ex. 3 | Ex. 4 | Ex 5 |
|---|---|---|---|---|---|---|
| Production Conditions | Raw material | Coal pitch | Coal pitch | Coal pitch | Coal pitch | Coal pitch |
| | Metal species | Fe | Fe | Fe | Fe | Fe |
| | Amount (part(s) by mass) of metal compound added | 0.9 | 0.9 | 0.7 | 0.9 | 0.9 |
| | Metal content (% by mass) in activated carbon precursor | 0.11 | 0.11 | 0.094 | 0.11 | 0.10 |

TABLE 1-continued

|  |  |  | Ex. 1 | Ex. 2 | Ex. 3 | Ex. 4 | Ex 5 |
|---|---|---|---|---|---|---|---|
|  | Activation atmosphere (%) | $CO_2$ | 100 | 100 | 100 | 100 | 100 |
|  |  | $H_2O$ | 0 | 0 | 0 | 0 | 0 |
|  |  | $O_2$ | 0 | 0 | 0 | 0 | 0 |
|  |  | $N_2$ | 0 | 0 | 0 | 0 | 0 |
|  |  | CO | 0 | 0 | 0 | 0 | 0 |
|  |  | Others | 0 | 0 | 0 | 0 | 0 |
|  | Activation temperature (° C.) |  | 950 | 950 | 950 | 950 | 950 |
|  | Activation time (min) |  | 25 | 40 | 40 | 50 | 40 |
| Physical Property Values of Activated Carbon | Iron (Fe) content (% by mass) in activated carbon |  | 0.184 | 0.251 | 0.189 | 0.318 | 0.235 |
|  | Yttrium (Y) content (% by mass) is activated carbon |  | 0 | 0 | 0 | 0 | 0 |
|  | Pore volume (cc/g) of pores with a size of 0.65 nm or less |  | 0.171 | 0.045 | 0.158 | 0.000 | 0.163 |
|  | Pore volume (cc/g) of pores with a size of 0.8 nm or less |  | 0.273 | 0.177 | 0.263 | 0.038 | 0.253 |
|  | Pore volume A (cc/g) of pores with a size of 1.0 nm or less |  | 0.350 | 0.396 | 0.356 | 0.303 | 0.346 |
|  | Pore volume (cc/g) of pores with a size of 1.5 nm or less |  | 0.373 | 0.510 | 0.407 | 0.563 | 0.396 |
|  | Pore volume (cc/g) of pores with a size of 2.0 nm or less |  | 0.374 | 0.523 | 0.411 | 0.584 | 0.397 |
|  | Pore volume (cc/g) of pores with a size of 2.5 nm or less |  | 0.375 | 0.528 | 0.413 | 0.594 | 0.397 |
|  | Pore volume (cc/g) of pores with a size of 3.0 nm or less |  | 0.379 | 0.533 | 0.419 | 0.601 | 0.398 |
|  | Pore volume (cc/g) of pores with a size of 3.5 nm or less |  | 0.391 | 0.549 | 0.428 | 0.619 | 0.417 |
|  | Pore volume B (cc/g) of pores with a size of 3.0-3.5 nm |  | 0.012 | 0.016 | 0.009 | 0.018 | 0.019 |
|  | Pore volume (cc/g) of pores with a size of 3.5 nm or more |  | 0.002 | 0.011 | 0.002 | 0.029 | 0.024 |
|  | Pore volume (cc/g) of pores with a size of 1.0-1.5 nm |  | 0.023 | 0.114 | 0.051 | 0.260 | 0.050 |
|  | Pore volume (cc/g) of pores with a size of 1.0-2.0 nm |  | 0.024 | 0.127 | 0.055 | 0.281 | 0.051 |
|  | Pore volume (cc/g) of pores with a size of 0.65-0.8 nm |  | 0.102 | 0.132 | 0.105 | 0.038 | 0.100 |
|  | Pore volume (cc/g) of pores with a size of 0.65-1.0 nm |  | 0.179 | 0.351 | 0.198 | 0.303 | 0.183 |
|  | Pore volume (cc/g) of pores with a size of 0.8-1.5 nm |  | 0.100 | 0.333 | 0.144 | 0.525 | 0.133 |
|  | Pore volume (cc/g) of pores with a size of 1.5-2.5 nm |  | 0.002 | 0.018 | 0.006 | 0.031 | 0.001 |
|  | Pore volume C (cc/g) of pores with a size of 2.0-3.0 nm |  | 0.01 | 0.01 | 0.01 | 0.02 | 0.00 |
|  | Pore volume (cc/g) of pores with a size of 2.0 nm or more |  | 0.02 | 0.04 | 0.02 | 0.06 | 0.04 |
|  | Pore volume (cc/g) of pores with a size of 2.5 nm or more |  | 0.02 | 0.03 | 0.02 | 0.05 | 0.04 |
|  | Pore volume B/pore volume A |  | 0.03 | 0.04 | 0.03 | 0.06 | 0.05 |
|  | Specific surface area ($m^2/g$) |  | 987.5 | 1356 | 1075 | 1492 | 1052 |
|  | Total pore volume (cc/g) |  | 0.393 | 0.560 | 0.430 | 0.648 | 0.441 |
|  | Proportion of pore volume A to total pore volume |  | 0.89 | 0.78 | 0.83 | 0.47 | 0.78 |
|  | Proportion of pore volume B to total pore volume |  | 0.031 | 0.029 | 0.021 | 0.028 | 0.043 |
|  | Proportion of pore volume C to total pore volume |  | 0.01 | 0.02 | 0.02 | 0.03 | 0.00 |
|  | Proportion of pore volume of pores with a size of 1.5 nm or less to total pore volume |  | 0.95 | 0.91 | 0.95 | 0.87 | 0.90 |
|  | Proportion of pore volume A to pore volume of pores with a size of 2.0 nm or less |  | 0.94 | 0.76 | 0.87 | 0.52 | 0.87 |
|  | Proportion of pore volume of pores with a size of 2.0 nm or less to total pore volume |  | 0.95 | 0.93 | 0.96 | 0.90 | 0.90 |
|  | Proportion of pore volume of pores with a size of 2.0 nm or more to total pore volume |  | 0.05 | 0.07 | 0.04 | 0.10 | 0.10 |
|  | Pore volume (cc/g) of pores with a size of 2.0-2.5 nm |  | 0.00 | 0.01 | 0.00 | 0.01 | 0.00 |
|  | Proportion of pore volume of pores with a size of 0.65 nm or less to total pore volume |  | 0.44 | 0.88 | 0.37 | 0.00 | 0.37 |
|  | Proportion of pore volume of pores with a size of 0.8 nm or less to total pore volume |  | 0.69 | 0.32 | 0.61 | 0.06 | 0.60 |
|  | Average fiber diameter (μm) |  | 13.9 | 13.6 | 13.8 | 13.2 | 13.4 |
| Adsorption Performance: trihalomethane filtration performance at 5 V 3000 (L/g) |  |  | 67 | 69 | 71 | 58 | 61 |
| Adsorption Performance: chloroform filtration performance at 5 V 3000 (L/g) |  |  | 52 | 65 | 56 | — | — |

TABLE 2

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Production Conditions | Raw material |  | Coal pitch | Coal pitch | Coal pitch | Coal pitch | Coal pitch | Coal pitch | Coal pitch |
|  | Metal species |  | Y | — | — | Y | Y | Y | Y |
|  | Amoun (part(s) by mass) of metal compound added |  | 1.3 | 0 | 0 | 0.3 | 0.3 | 0.3 | 1.0 |
|  | Metal content (% by mass) in activated carbon precursor |  | 0.25 | 0 | 0 | 0.06 | 0.06 | 0.06 | 0.16 |
|  | Activation atmosphere (%) | $CO_2$ | 0 | 0 | 100 | 100 | 100 | 100 | 50 |
|  |  | $H_2O$ | 100 | 100 | 0 | 0 | 0 | 0 | 0 |
|  |  | $O_2$ | 0 | 0 | 0 | 0 | 0 | 0 | 0 |
|  |  | $N_2$ | 0 | 0 | 0 | 0 | 0 | 0 | 0 |

TABLE 2-continued

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
|  | CO | 0 | 0 | 0 | 0 | 0 | 0 | 0 |
|  | Others | 0 | 0 | 0 | 0 | 0 | 0 | 0 |
|  | Activation temperature (° C.) | 900 | 875 | 950 | 950 | 950 | 950 | 950 |
|  | Activation time (min) | 20 | 40 | 60 | 67 | 70 | 60 | 20 |
| Physical | Iron (Fe) content (% by mass) in activated carbon | 0 | 0 | 0 | 0 | 0 | 0 | 0 |
| Property | Yttrium (Y) content (% by mass) in activated carbon | 0.66 | 0 | 0 | 0.17 | 0.18 | 0.15 | 0.46 |
| Values of | Pore volume (cc/g) of pores with a size of 0.65 nm or less | 0.075 | 0.221 | 0.198 | 0.156 | 0.162 | 0.170 | 0.080 |
| Activated | Pore volume (cc/g) of pores with a size of 0.8 nm or less | 0.149 | 0.333 | 0.281 | 0.278 | 0.287 | 0.296 | 0.159 |
| Carbon | Pore volume A (cc/g) of pores with a size of 1.0 nm or less | 0.241 | 0.401 | 0.311 | 0.418 | 0.431 | 0.429 | 0.255 |
|  | Pore volume (cc/g) of pores with a size of 1.5 nm or less | 0.339 | 0.465 | 0.315 | 0.613 | 0.636 | 0.581 | 0.353 |
|  | Pore volume (cc/g) of pores with a size of 2.0 nm or less | 0.410 | 0.476 | 0.315 | 0.689 | 0.723 | 0.627 | 0.433 |
|  | Pore volume (cc/g) of pores with a size of 2.5 nm or less | 0.470 | 0.476 | 0.315 | 0.718 | 0.757 | 0.636 | 0.505 |
|  | Pore volume (cc/g) of pores with a size of 3.0 nm or less | 0.520 | 0.476 | 0.315 | 0.724 | 0.767 | 0.636 | 0.566 |
|  | Pore volume (cc/g) of pores with a size of 3.5 nm or less | 0.562 | 0.476 | 0.315 | 0.724 | 0.767 | 0.636 | 0.600 |
|  | Pore volume B (cc/g) of pores with a size of 3.0-3.5 nm or less | 0.042 | 0.000 | 0.000 | 0.000 | 0.000 | 0.000 | 0.034 |
|  | Pore volume (cc/g) of pores with a size of 3.5 nm or less | 0.010 | 0.000 | 0.000 | 0.000 | 0.000 | 0.000 | 0.000 |
|  | Pore volume (cc/g) of pores with a size of 1.0-1.5 nm or less | 0.098 | 0.064 | 0.004 | 0.195 | 0.205 | 0.152 | 0.098 |
|  | Pore volume (cc/g) of pores with a size of 1.0-2.0 nm or less | 0.169 | 0.075 | 0.004 | 0.271 | 0.292 | 0.198 | 0.178 |
|  | Pore volume (cc/g) of pores with a size of 0.65-0.8 nm or less | 0.074 | 0.112 | 0.083 | 0.122 | 0.125 | 0.126 | 0.079 |
|  | Pore volume (cc/g) of pores with a size of 0.65-1.0 nm or less | 0.166 | 0.180 | 0.113 | 0.262 | 0.269 | 0.259 | 0.175 |
|  | Pore volume (cc/g) of pores with a size of 0.8-1.5 nm or less | 0.190 | 0.132 | 0.034 | 0.335 | 0.349 | 0.285 | 0.194 |
|  | Pore volume (cc/g) of pores with a size of 1.5-2.5 nm or less | 0.131 | 0.011 | 0.000 | 0.105 | 0.121 | 0.055 | 0.152 |
|  | Pore volume C (cc/g) of pores with a size of 2.0-3.0 nm or less | 0.11 | 0.00 | 0.00 | 0.04 | 0.04 | 0.01 | 0.13 |
|  | Pore volume (cc/g) of pores with a size of 2.0 nm or less | 0.16 | 0.00 | 0.00 | 0.04 | 0.04 | 0.01 | 0.17 |
|  | Pore volume (cc/g) of pores with a size of 2.5 nm or less | 0.10 | 0.00 | 0.00 | 0.01 | 0.01 | 0.00 | 0.10 |
|  | Pore volume B/pore valuune A | 0.17 | 0.00 | 0.00 | 0 00 | 0.00 | 0.00 | 0.13 |
|  | Specific surface area (m³/g) | 974 | 1257 | 814 | 1714 | 1797 | 1578 | 1128 |
|  | Total pore volume (cc/g) | 0.572 | 0.476 | 0.315 | 0.724 | 0.767 | 0.636 | 0.600 |
|  | Proportion of pore volume A to total pore volume | 0.42 | 0.84 | 0.99 | 0.58 | 0.56 | 0.67 | 0.43 |
|  | Proportion of pore volume B to total pore volume | 0.073 | 0.000 | 0.000 | 0.000 | 0.000 | 0.000 | 0.057 |
|  | Proportion of pore volume C to total pore volume | 0.19 | 0.00 | 0.00 | 0.05 | 0.06 | 0.01 | 0.22 |
|  | Proportion of pore volume of pores with a size of 1.5 nm or less to total pore volume | 0.59 | 0.98 | 1.00 | 0.85 | 0.83 | 0.91 | 0.59 |
|  | Proportion of pore volume A to pore value of pores with a size of 2.0 nm or less | 0.59 | 0.84 | 0.99 | 0.61 | 0.60 | 0.68 | 0.59 |
|  | Proportion of pore volume of pores with a size of 2.0 nm or less to total pore volume | 0.72 | 1.00 | 1.00 | 0.95 | 0.94 | 0.99 | 0.72 |
|  | Proportion of pore volume of pores with a size of 2.0 nm or more to total pore volume | 0.28 | 0.00 | 0.00 | 0.05 | 0.06 | 0.01 | 0.28 |
|  | Pore volume (cc/gg) of pores with a size of 2.0-2.5 nm | 0.06 | 0.00 | 0.00 | 0.03 | 0.03 | 0.01 | 0.07 |
|  | Proportion of pore volume of pores with a size of 0.65 nm or less to total pore volume | 0.13 | 0.46 | 0.63 | 0.22 | 0.21 | 0.27 | 0.13 |
|  | Proportion of pore volume of pores with a size of 0.8 nm or less to total pore volume | 0.26 | 0.70 | 0.89 | 0.38 | 0.37 | 0.47 | 0.27 |
|  | Average fiber diameter (μm) | 16.5 | 16.7 | 18.5 | 16.8 | 16.8 | 18.2 | 14.6 |
| Adsorption Performance: trihalomethane filtration performance at SV 3000 (L/g) | | 37 | 12 | 44 | 26 | 29 | 28 | 41 |
| Adsorption Performance: chloroform filtration performance at SV 3000 (L/g) | | 27 | — | — | — | — | — | — |

In the activated carbons of Examples 1 to 5, the pore volume A of pores with a size of 1.0 nm or less, of pore volumes calculated by the QSDFT method, was 0.3 cc/g or more, and the pore volume B of pores with a size of 3.0 nm or more and 3.5 nm or less, of pore volumes calculated by the QSDFT method, was 0.009 cc/g or more, and therefore, these activated carbons had high total trihalomethane filtration capacities, even in water treatment by passing water at a high superficial velocity (SV).

In contrast, in the activated carbons of Comparative Examples 1 and 7, the pore volume A of pores with a size of 1.0 nm or less, of pore volumes calculated by the QSDFT method, was less than 0.3 cc/g, and therefore, the total trihalomethane filtration capacity was inferior.

In the activated carbons of Comparative Examples 2 to 6, the pore volume B of pores with a size of 3.0 nm or more and 3.5 nm or less, of pore volumes calculated by the QSDFT method, was less than 0.009 cc/g, and therefore, the total trihalomethane filtration capacity was lower.

The invention claimed is:

1. An activated carbon in which a pore volume A of pores with a size of 1.0 nm or less, of pore volumes calculated by the Quenched Solid Density Functional Theory (QSDFT) method, is between 0.30 and 0.50 cc/g, and a pore volume B of pores with a size of 3.0 nm or more and 3.5 nm or less, of pore volumes calculated by the Quenched Solid Density Functional Theory (QSDFT) method, is between 0.009 and 0.025 cc/g.

2. The activated carbon according to claim 1, wherein a pore volume C of pores with a size of 2.0 nm or more and 3.0 nm or less, of pore volumes calculated by the Quenched Solid Density Functional Theory (QSDFT) method, is 0.05 cc/g or less.

3. The activated carbon according to claim 1, wherein a proportion of a pore volume (cc/g) of pores with a size of 1.5 nm or less, of pore volumes calculated by the Quenched Solid Density Functional Theory (QSDFT) method, relative to a total pore volume (cc/g) of the activated carbon calculated by the Quenched Solid Density Functional Theory (QSDFT) method, is 0.85 or more.

4. The activated carbon according to claim 1, wherein the activated carbon has a specific surface area of 500 to 1800 $m^2/g$.

5. The activated carbon according to claim 1, wherein the activated carbon has a total trihalomethane filtration capacity of 45 L/g or more.

6. The activated carbon according to claim 1, wherein the activated carbon is a fibrous activated carbon.

7. A method for producing the activated carbon according to claim 1, comprising the step of activating an activated carbon precursor comprising 0.1 to 1.5% by mass of iron at a temperature of 900 to 1000° C. in an atmosphere having a $CO_2$ concentration of 90% by volume or more.

* * * * *